United States Patent [19]

Jorgensen et al.

[11] 4,005,876
[45] Feb. 1, 1977

[54] GAS GENERATOR FOR AUTOMOBILE SAFETY CUSHIONS

[75] Inventors: Howard E. Jorgensen, Hyrum; George F. Kirchoff, Brigham City; Fred E. Schneiter, North Ogden, all of Utah

[73] Assignee: Thiokol Corporation, Newtown, Pa.

[22] Filed: Apr. 10, 1975

[21] Appl. No.: 566,871

[52] U.S. Cl. .................................. 280/741; 102/39
[51] Int. Cl.² ........................................ B60R 21/10
[58] Field of Search ............ 280/150 AB, 741, 740; 102/39; 222/3, 5; 23/281

[56] References Cited
UNITED STATES PATENTS

| | | | |
|---|---|---|---|
| 3,066,014 | 11/1962 | White et al. | 280/150 AB X |
| 3,527,472 | 9/1970 | Chute et al. | 280/150 AB |
| 3,666,289 | 5/1972 | Magyar | 280/150 AB |
| 3,692,495 | 9/1972 | Schneiter et al. | 280/150 AB |
| 3,877,882 | 4/1975 | Lette et al. | 280/150 AB |
| 3,880,447 | 4/1975 | Thorn et al. | 280/150 AB |
| 3,904,221 | 9/1975 | Shiki et al. | 102/39 |

Primary Examiner—Kenneth H. Betts
Attorney, Agent, or Firm—Stanley A. Marcus; Edward E. McCullough

[57] ABSTRACT

An elongated gas generator, designed especially for use on the passenger side of the front seat position of an automotive vehicle, has a combustion cartridge having a central, electrically initiated igniter surrounded by gas generant material. This, in turn, is surrounded by filtering screens and by a perforated, tubular housing. A pH neutralizing material is located adjacent the openings of the housing for neutralizing gases produced by the burning gas generant. At least one other perforated case encloses the housing, and multiple layers of wire cooling screens are interposed between the housing and the case enclosing it. The openings in the housing are arranged relative to those of the outer case so that a long path is created for gases passing through the cooling screens, parallel to the layers thereof. The cooled and filtered gases are discharged directly from the outer case into a structure to be inflated.

2 Claims, 7 Drawing Figures

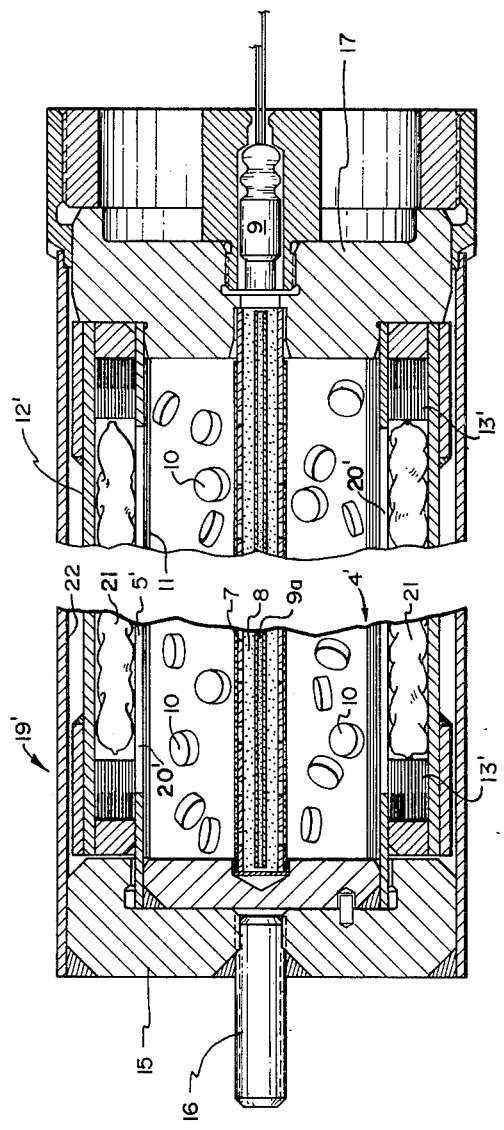
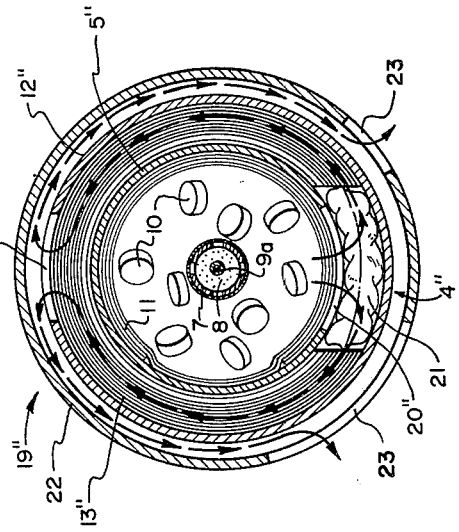
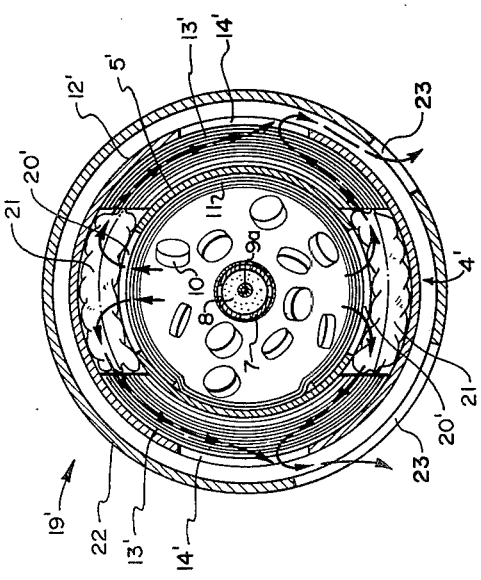

GAS GENERATOR FOR AUTOMOBILE SAFETY CUSHIONS

REFERENCE TO RELATED APPLICATIONS

This invention is related to that of patent application Ser. No. 417,349, "Gas Generator" by F. Schneiter, et al, filed Nov. 19, 1973 now U.S. Pat. No. 3,985,076 and to patent application Ser. No. 557,204, "Multi-Level, Cool Gas Generator" by G. Kirchoff, et al, filed Mar. 10, 1975, now U.S. Pat. No. 3,972,545. These applications and the present application are owned by the same assignee.

BACKGROUND OF THE INVENTION

This invention relates broadly to gas generators and particularly to solid fuel gas generators suitable for rapidly filling inflatable structures on the passenger side of automotive vehicles.

Of particular interest in the present invention is its use for inflating safety cushions in the presence of humans; and, hence, the gases produced must be nontoxic, nonflammable, and relatively cool. Such cushions are designed to be automatically inflated within about thirty milliseconds to protect human occupants of a vehicle, in the event of a collision of the vehicle with some other object.

Solid fuel gas generators for this purpose are known in the prior art. For example, a two-stage system is shown and described in U.S. Pat. No. 3,663,035 to T. W. Norton, titled "Self-Contained Passenger Restraining System." This patent, however, does not deal with the problem of cooling the gases of the gas generator, which is the primary objective of the present invention. It has been found that gases produced by combustible materials that are capable of inflating a structure within the required time period are invariably capable of burning human occupants of the vehicle, without cooling means for the gases.

SUMMARY OF THE INVENTION

The present invention is basically an elongated gas generator, of tubular construction, that is closed at both ends and that may be mounted in a variety of ways for convenience of automobile designers.

An elongated combustion cartridge has a tubular housing that contains a coextensive, centrally located igniter surrounded by gas generant material, that is in turn surrounded by a plurality of layers of filtering screens. This housing is enclosed in a tubular outer case, with layers of wire cooling screens interposed between the housing and the outer case. Openings in the housing are arranged relative to those of the outer case to create a long path for the combustion gases passing through the cooling screens.

The layers of wire screens are oriented circumferentially about the tubular housing, and the opening in the housing may be angularly spaced as much as 180° from that of the outer case. Hence, combustion gases flowing through the screen must flow parallel to the layers thereof, rather than in the more obvious, conventional direction at right angles to the layers of screen. This provides a path of maximum length for the gases through the cooling screens, while employing a minimal volume of screen; and promotes ultimate compactness of the gas generator for inflating safety cushions.

In one embodiment, the housing is arranged eccentrically in the outer case; so that it touches the wall thereof to create a space on one side between the housing and outer case. This space is packed with layers of cooling screen. Openings in the housing and outer case are angularly spaced apart, so that a long path is provided for the gases through a minimal volume of screen, as described above.

Packages of pH neutralizing material may be interposed between the openings in the housing and the cooling screens. Also, the igniter, gas generant, and filtering screens may be enclosed in an easily rupturable, hermetically sealed container, to provide an expendable, replaceable capsule.

A primary object of the invention is to provide such a gas generator that is of maximum compactness, requiring a minimum volume of space for installation on the passenger side of an automotive vehicle. Another object to the invention is to provide a gas generator that may be mounted either within or adjacent the structure to be inflated.

An important feature of the invention is that the geometries of the combustion cartridge housing and outer case are arranged to create a long path through the cooling screens for the combustion gases; so that a small amount of screening may do the work of a much larger quantity thereof. Also, the invention is essentially constructed of tubular material; and, hence, is easy and inexpensive to manufacture.

Other objects and features of the invention will become apparent as the following detailed description is read with reference to the accompanying drawings, wherein the same parts are designated by the same numbers throughout the disclosure.

DESCRIPTION OF THE DRAWINGS

In the drawings:
FIG. 5 is a longitudinal section of a second embodiment of the invention;
FIG. 6 is a full cross section of FIG. 5;
and
FIG. 7 is similar to FIG. 6, but shows a third embodiment of the invention.

DESCRIPTION OF THE PREFERRED EMBODIMENTS

Figure 2:
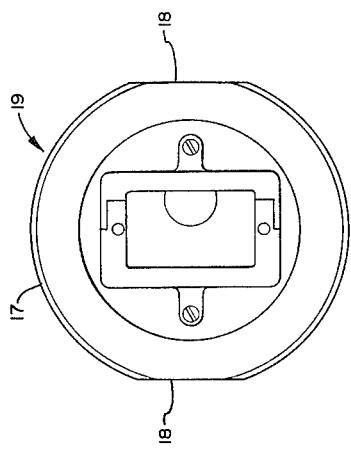
FIG. 2 is an end view of the invention.
Figure 1:
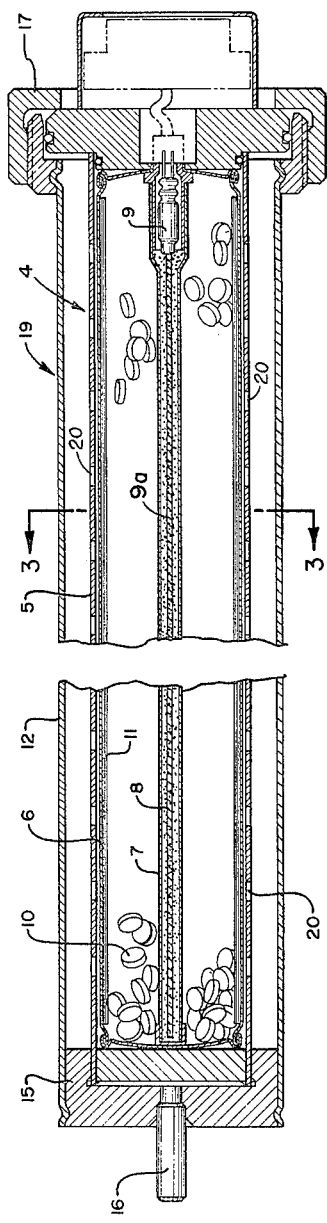
FIG. 1 is a longitudinal section of the invention.
Figure 3:
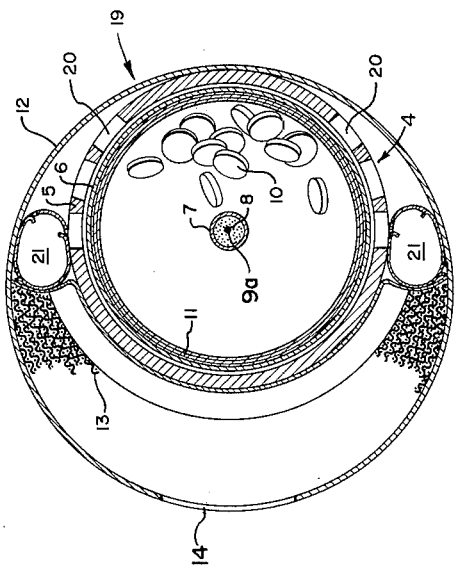
FIG. 3 is a full cross section of the invention taken at Line 3—3 of FIG. 1.
Figure 4:
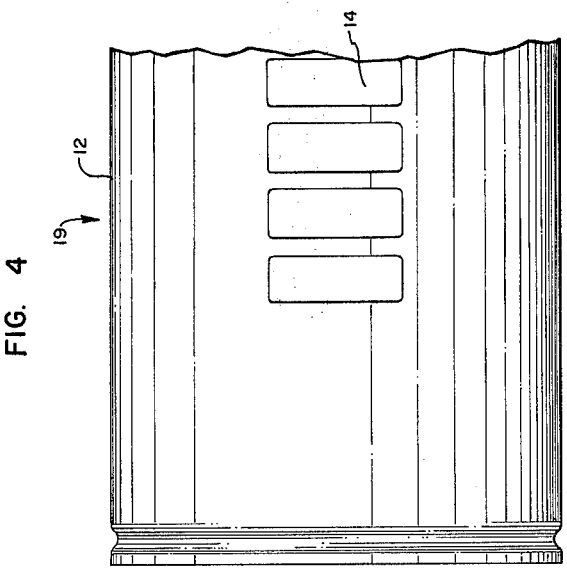
FIG. 4 is a fragmentary front elevation of the invention.

As shown in FIGS. 1 through 4, a combustion cartridge 4 has an elongated, perforated tube 5 forming a housing that encloses an elongated, easily rupturable, hermetically sealed, aluminum container 6. A small diameter, elongated, steel tube 7, is centrally located inside the container 6. This tube 7 is filled with a pyrotechnic material 8 and also contains an electric squib 9 contiguous with a long fuse 9a. Although the pyrotechnic material 8 may be any of a variety of compositions meeting the requirements for rapid ignition and non-toxicity, a typical material for this use is a granular mixture of 25% by weight of boron and 75% of potassium nitrate. This central tube 7 is surrounded by pellets 10 of a gas generant material that typically comprises a mixture by weight of 55% sodium azide ($NaN_3$) and 45% anhydrous chromic chloride ($CrCl_3$). However, any of a number of other compositions may be used for this purpose if they meet the requirements for burning rate, nontoxicity, and flame temperature. The gas generant material 10 is, in turn, surrounded by a plurality of layers of filtering screens 11, preferably made of fine wire screen of about 30 to 60 mesh. These layers of screen 11 are arranged against the inner wall of the container 6.

The housing 5 is arranged eccentrically against the inner wall of the larger diameter, perforated, outer case 12; so that a space is provided for layers of cooling screen 13 that are packed between a housing 5 and the slots 14 that perforate one side of the outer case 12. Two long, plastic film packages 21 of pH neutralizing material are located adjacent the openings 20 of the housing 5. This material is typically iron sulfate ($FeSO_4$ or $Fe_2(SO_4)_3$) and is effective in neutralizing the slight alkalinity of the typical combustion gases. As the gas generant material is burned, gases therefrom must pass through the cooling screens 13, substantially parallel to the layers thereof, before escaping through the slots 14 and into an inflatable structure, not shown.

One end of this tubular assemblage is closed by an end cap 15 having a pin 16 that may be fitted to a mounting bracket not shown. The opposite end is closed by a second end cap 17 that carries a keying means, such as the flattened sides 18 that may be used in conjunction with a mounting bracket for orienting the gas generator 19 with respect to an inflatable structure.

As the vehicle collides with another object, the impact causes a sensor to produce an electric signal that fires the squib 9, igniting the pyrotechnic material 8. This ruptures the central tube 7 and ignites the gas generant material 10 to produce large quantities of nontoxic gases that pass through the filtering screens 11 to rupture the walls of the container 6 and escape through the perforations 20 of the housing 5.

In FIGS. 5 and 6, all components are substantially the same as those described above, except that the aluminum container 6 is eliminated (it may be used if desired, however) and the housing 5' is centrally located in the outer case 12'. Also, an external, diffuser tube 22 is added. There are two rows of openings 20' in the housing 5', and they are diametrically opposite one another. The packages 21 of the pH neutralizing material are adjacent the openings 20'; and the cooling screens 13', in two segments, are arranged symmetrically about the housing 5' between the packages 21 of pH neutralizing material.

All of the components of this embodiment, except for the diffuser tube 22, are fitted inside the outer case 12'. Two rows of slots 14' in the outer case 12' are diametrically opposite one another and arranged so that each is midway between the two openings 20'. As shown by the arrows in FIG. 6, this creates a long, 90° path for the gas flow. Each gas jet emerging through a row of openings 20' in the housing 5' is divided into two parts that flow in opposite directions around the housing 5', parallel to the layers of cooling screen 13', and through the slots 14' of the outer case 12'. They then emerge through the slots 23 of the diffuser tube 22.

It is important to note that the paths of the gases through the cooling screens 13' are substantially parallel to the layers of screen. This provides a much longer path than would the more obvious, conventional route perpendicular to the layers of screen. In this way, a relatively small amount of screening can perform the function of the much greater quantity that would otherwise be necessary.

FIG. 7 shows a third embodiment of the invention. This embodiment has the same components as shown in FIGS. 5 and 6. However, the housing 5'' has only one row of openings 29''; and there is only one package 21 of pH neutralizing material, which is located adjacent the row of openings 20''. Hence, the combustion gases emerging through the row of openings 20'' in the housing 5'' must pass through the pH neutralizing material 21. The row of openings 14'' in the outer case 12'' is located diametrically opposite the openings 20'' of the housing 5''. Gases passing through the openings 20'' are divided into two streams by the wall of the outer case 12''; they flow in opposite directions through the cooling screens 13'', parallel to the layers thereof. They emerge through the openings 14'' of the outer case 12'' and flow between the outer case 12'' and the diffuser tube 22 until they emerge through the openings 23 in the latter. This creates a very long path for the combustion gases that effectively cools them before discharge into an inflatable structure.

An invention has been described that advances the art of gas generators for inflating structures in the presence of humans. Although the preferred embodiments have been described specifically with regard to detail, it should be noted that many such details may be altered without departing from the scope of the invention, as it is defined in the following claims.

The invention claimed is:
1. A gas generator comprising:
    a combustion cartridge comprising a closed tube, a gas generant material and igniter therefore in the tube, filtering screens inside the tube surrounding the gas generant, and two diametrically opposite openings in the tube through which combustion gases may flow;
    an outer case surrounding the combustion cartridge and having two diametrically opposite openings that are angularly spaced 90° from those in the combustion cartridge;
    two long, plastic-film packages of pH neutralizing material, one located at each opening of the combustion cartridge and confined between the combustion cartridge and the outer case; and
    layers of wire screen oriented circumferentially about the combustion cartridge and confined between the combustion cartridge and the outer case, and between the two packages of pH neutralizing material, whereby combustion gases from the combustion cartridge must flow through the screens, substantially parallel to the layers thereof, before being discharged through the openings in the outer case, thereby providing a long path for the gases through a minimal volume of screen.

2. The gas generator of claim 1 further including a hermetically sealed, easily-rupturable container that fits inside the closed tube of the combustion cartridge and contains the igniter, gas generant, and filtering screens.

* * * * *